United States Patent
Wobben

(10) Patent No.: US 6,785,637 B1
(45) Date of Patent: Aug. 31, 2004

(54) METHOD FOR MONITORING WIND POWER PLANTS

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 10/089,774
(22) PCT Filed: Jul. 7, 2000
(86) PCT No.: PCT/EP00/06433
§ 371 (c)(1), (2), (4) Date: Jun. 18, 2002
(87) PCT Pub. No.: WO01/25631
PCT Pub. Date: Apr. 12, 2001

(30) Foreign Application Priority Data

Oct. 6, 1999 (DE) ......................................... 199 48 194

(51) Int. Cl.⁷ ................................................ G01H 1/00
(52) U.S. Cl. ........................... 702/188; 702/31; 702/32; 702/33; 702/34; 702/35; 702/39; 702/44
(58) Field of Search ............................... 702/31–35, 39, 702/44, 48, 54, 182, 183, 185, 188, 191, FOR 108, FOR 137, FOR 155, FOR 158–159, FOR 166; 73/116, 587, 589, 593, 659, 660, 801; 416/31, 114, 118, 228, 500, 241, 23; 415/17, 26, 29, 47–50

(56) References Cited

U.S. PATENT DOCUMENTS

| | | | | |
|---|---|---|---|---|
| 4,198,866 A | * | 4/1980 | Birjukov et al. | 73/613 |
| 4,396,843 A | * | 8/1983 | Martinez Parra | 290/55 |
| 4,423,634 A | * | 1/1984 | Audenard et al. | 73/587 |
| 5,162,659 A | * | 11/1992 | Diamond et al. | 250/559.13 |
| 5,479,818 A | * | 1/1996 | Walter et al. | 73/116 |
| 5,738,310 A | * | 4/1998 | Rollet et al. | 244/195 |
| 5,845,230 A | | 12/1998 | Lamberson | |
| 5,942,690 A | * | 8/1999 | Shvetsky | 73/660 |
| 6,014,896 A | * | 1/2000 | Schoess | 73/583 |
| 6,076,405 A | * | 6/2000 | Schoess | 73/587 |
| 6,076,776 A | * | 6/2000 | Breitbach et al. | 244/219 |
| 6,231,306 B1 | * | 5/2001 | Khalid | 416/26 |
| 6,278,197 B1 | * | 8/2001 | Appa | 290/55 |
| 6,398,502 B1 | * | 6/2002 | Wobben | 416/228 |
| 2002/0047275 A1 | * | 4/2002 | Wobben | 290/55 |
| 2003/0066934 A1 | * | 4/2003 | Bolonkin | 244/153 R |

FOREIGN PATENT DOCUMENTS

| | | |
|---|---|---|
| DE | 27 51 228 | 5/1979 |
| DE | 31 12 122 C2 | 7/1982 |
| DE | 39 41 290 A1 | 6/1991 |
| DE | 296 09 242 U1 | 9/1996 |
| DE | 195 34 404 A1 | 3/1997 |
| DE | 195 45 008 A1 | 8/1997 |
| DE | 196 20 906 | 1/1998 |
| DE | 197 45 007 A1 | 4/1998 |
| DE | 197 31 918 A1 | 1/1999 |
| DE | 198 52 229 A1 | 8/2000 |
| EP | 0 072 598 | 2/1983 |
| WO | WO 84/03702 | 12/1981 |
| WO | PCT/AT89/00126 | 7/1990 |

OTHER PUBLICATIONS

FLENDER ESAT, Engineering & Service für die Antriebstechnik (including English translation).
VDI Berichte Nr. 1515 (1999) (including English translation).
FLENDER ESAT, ESAT Application Reports.
"Wälzlagerdiagnostik für Maschinen und Anlagen" von Sturm, Förster, Hippmann, Kinsky; VEB Verlag Technik, Berlin 1985, Seiten 57, 58, 78 bis 80, 133 bis 137, 150 bis 153.
"Allianz–Handbuch der Schadenverhütung", VDI–Verlag, 1984, 3.Auflage; ISBN: 3–18–419089–7, Seiten 34, 35, 49.
"Studie Diagnosesysteme" von Dr. Ellmer, Heft 412 der FVA, Forschungsvorhaben Nr. 242, Drucklegung Dec. 12, 1993, Seiten 3, 5 und 7.

* cited by examiner

Primary Examiner—Marc S. Hoff
Assistant Examiner—Carol Tsai
(74) Attorney, Agent, or Firm—Neil A. Steinberg

(57) ABSTRACT

There are many inventions described herein. In one aspect, the present invention is a method of acoustically monitoring a wind power installation that generates electrical power. The wind power installation includes a plurality of components, including at least rotor blades. The method comprises detecting an operating acoustic spectrum generated by at least one of the components during operation of the wind power installation and comparing the operating acoustic spectrum to a reference acoustic spectrum. The method of this aspect of the invention further comprises detecting a deviation between the operating acoustic spectrum and the reference acoustic spectrum and detecting whether the deviation exceeds a threshold. In the event that the deviation between the operating acoustic spectrum and the reference acoustic spectrum exceeds the threshold, the method of the present invention also communicates audible sounds which caused the deviation between the operating acoustic spectrum and the reference acoustic spectrum to a remote monitoring center.

26 Claims, No Drawings

METHOD FOR MONITORING WIND POWER PLANTS

BACKGROUND OF THE INVENTION

The invention concerns a method of monitoring wind power installations, wherein in particular acoustic monitoring is effected.

For effective use of wind power installations, it is advantageous for regulation and operational management of a wind power installation to be carried out in such a way as to ensure fully automatic operation of the installation. Any other mode of operation which requires manual intervention in the normal operating procedure is unacceptable for economic considerations. In order to further increase the economy of the installation, regulation should be effected in such a way that the degree of energy conversion achieved in each operating condition is as high as possible. A further important aspect in terms of regulation and operational management of a wind power installation is operational safety. Technical faults and environmentally induced danger conditions must be recognised and the safety systems present triggered. In addition a regulating system can contribute to reducing the mechanical loading on the wind power installation.

In terms of monitoring wind power installations it is also desirable if remote analysis can be carried out. That has the advantage that detection of respective operating data can be implemented centrally. Remote monitoring of that kind can lead to an increase in the economy of the installation and an increase in the average availability of the installation. In that situation for example the operating data are interrogated and analysed by a service centre or a remote monitoring centre. By means of analysis of the inputted parameters, it is possible on the one hand to afford early recognition of problems occurring, while on the other hand the operating data can provide important indications regarding the production and wind data for the development department. Analysis of such data by the development department can result in improvements to the wind power installation.

In a known wind power installation for example the following parameters are regularly monitored by sensor means: wind speed, wind direction, air density, rotary speed per minute (average and extreme values), temperatures, currents, voltages, switching pulse, lightning strikes (event counters) etc.

Analysis of the inputted parameters by the remote monitoring centre can result in an improvement in the on-site service as the remote monitoring centre can give the on-site service precise indications in regard to the fault sources.

For further improving maintenance, safety and economy of a wind power installation, it is desirable for further parameters of the wind power installation to be monitored.

BRIEF SUMMARY OF THE INVENTION

Therefore, the object of the invention is to improve monitoring of wind power installations.

In accordance with the invention, that object is attained by acoustic monitoring, in addition to the above-described monitoring of a wind power installation.

The advantages achieved with the invention are in particular that it is possible to implement improved early fault detection in order to avoid consequential damage. That for example can result in the recognition of loose screw connections, electrical faults in the generator area, in regard to the inverter, or in regard to the transformer and wear or icing on the rotor blades at an early stage.

In accordance with the invention, for acoustic monitoring of wind power installations, firstly a reference noise spectrum of an installation or parts thereof is recorded and stored. The operating noise spectrum can be continuously or repetitively recorded during operation and compared to the stored reference spectrum and deviations between those two spectra can be detected. Instead of recording a reference noise spectrum of a wind power installation, it is also possible to have recourse to an already stored reference noise spectrum of a wind power installation.

In accordance with an advantageous embodiment of the invention the detected deviations between the operating and reference noise spectra are communicated to a remote monitoring centre in order to undergo central analysis.

Advantageously likewise the original noises which are recorded by a sound pick-up and which have given rise to the deviation between the operating spectrum and the reference spectrum can be communicated to the remote monitoring centre so that the operating personnel at the centre can themselves check the noises by listening thereto.

In that respect it is particularly advantageous to form a noise pattern from the original noises and in turn to build up an acoustic data bank from those noise patterns.

If the deviations between the operating spectrum and the reference spectrum are greater than a predetermined threshold value the wind power installation is possibly switched off.

DETAILED DESCRIPTION OF THE INVENTION

An embodiment of the invention is described hereinafter.

In accordance with the invention, in a trial run with a wind power installation, a respective typical reference noise spectrum or reference noise profile of the wind power installation is recorded for given operating ranges such as for example part-load or rated load, and stored in a data memory. In the case of wind power installations of the same structure, it is also possible to use a reference noise spectrum which has already been stored, instead of recording a specific reference noise spectrum for the installation. A plurality of set-up locations for sound pick-ups in the wind power installation are possible, for recording the noise spectrum. For example, it is possible to monitor the rotor blades, the generator or the drive train and the electronics. For the purposes of monitoring the rotor blades, a sound pick-up is mounted for example externally on the tower, for the purposes of monitoring the generator and the drive train a sound pick-up is mounted in the pod and for monitoring the electronics a sound pick-up is mounted in the tower base or in the transformer station. The positions at which the sound pick-ups are set up should not be altered between recording the reference noise spectrum and recording the operating noise spectrum.

In operation of the wind power installation the respective sound (for example as a frequency spectrum of between 0.1 Hz and 30 KHz) is recorded in dependence on the operating point or working range such as for example from 0 KW to the rated power output. That operating sound is compared to the reference noise spectrum and evaluated.

When the operating noise spectrum is detected, the working range or the operating range of the wind power installation is firstly determined in order to compare the operating noise spectrum of the respective range to the corresponding reference noise spectrum. If in that situation there are deviations which exceed a predetermined threshold value, a fault message is produced, which is signaled to the remote monitoring centre and possibly the wind power installation is shut down automatically or manually (by the centre).

When detecting a deviation between the operating noise spectrum and the reference noise spectrum, which exceeds the threshold value, then a fault message is communicated to the remote monitoring centre, as described above. Accurate analysis of the fault message or the deviations can be implemented in the remote monitoring centre. The operating staff in the remote monitoring centre can possibly react quickly to the fault message and communicate that fault message to the maintenance staff on site. In that way early fault detection can take place in good time and faults of that kind can be quickly dealt with by the maintenance staff. In addition consequential damage can be avoided in that way. The average availability of the installation and thus the economy of the installation can be increased by such an improvement in maintenance and upkeep of the wind power installation.

In order to improve fault diagnosis the original noise which was recorded by a sound pick-up and which caused the deviation between the operating spectrum and the reference spectrum can be communicated to the remote monitoring centre. There the operating staff can listen to the noises in question, in a more sophisticated and subtly differentiated manner, and possibly implement suitable measures. A procedure of that kind is desirable as the human ear reacts more sensitively and more selectively to given noises than a signal processing device.

To relieve the load on the operating staff of the remote monitoring centre, noise patterns can be formed from the original noises (audio signals) and an acoustic data bank can be built up from those patterns. A signal processing device compares the recorded noises of a wind power installation with the stored noise patterns and already implements a pre-selection among the possible fault causes. For example the recorded audio signals can be digitised and converted into noise patterns and then subjected to further digital processing. The operating staff of the remote monitoring centre can thus listen to the noise and in that situation already have at hand possible fault causes suggested by the signal processing device. That procedure can result in an improvement to and a relief of load at the workplace for the operating staff of the remote monitoring centre and make the monitoring procedure more efficient.

In addition, it is possible to obtain information about the cause and the variation in respect of time of a fault, by building up a data bank in which all deviations between the operating noise spectrum and the reference noise spectrum are stored in respect of time. In addition the data of that data bank can be compared to data of the other operating parameters such as for example wind speed, temperature, current, voltage and so forth. A correlation in regard to fault development can possibly be found from the comparison of such data. Indications of that kind would be very valuable from the point of view of the development department as that knowledge can be used when developing fresh installations and in the further development of existing installations.

What is claimed is:

1. A method of acoustically monitoring a wind power installation that generates electrical power, wherein the wind power installation includes a plurality of components including at least rotor blades, the method comprising:

detecting an operating acoustic spectrum generated by at least one of the components during operation of the wind power installation;

comparing the operating acoustic spectrum to a reference acoustic spectrum;

detecting a deviation between the operating acoustic spectrum and the reference acoustic spectrum;

detecting whether the deviation between the operating acoustic spectrum and the reference acoustic spectrum exceeds a threshold; and communicating audible sounds which caused the deviation between the operating acoustic spectrum and the reference acoustic spectrum to a remote monitoring center when the deviation between the operating acoustic spectrum and the reference acoustic spectrum exceeds the threshold.

2. The method of claim 1 wherein the reference acoustic spectrum is an acoustic spectrum produced by the component during normal operation.

3. The method of claim 1 wherein the reference acoustic spectrum is an acoustic spectrum that is expected to be generated by the component during normal operation.

4. The method of claim 1 wherein when the deviation between the operating acoustic spectrum and the reference acoustic spectrum exceeds the threshold, the operation of the wind power installation is automatically or manually terminated.

5. The method of claim 1 further including:

repetitively detecting the operating acoustic spectrum generated by the component of the wind power installation;

repetitively comparing the detected operating acoustic spectrums to a reference acoustic spectrum; and detecting whether the comparison between the detected operating acoustic spectrums to a reference acoustic spectrum exceeds a threshold.

6. The method of claim 1 further including:

continuously detecting the operating acoustic spectrum generated by the component of the wind power installation;

comparing the detected operating acoustic spectrums to a reference acoustic spectrum; and detecting whether the comparison between the detected operating acoustic spectrums to a reference acoustic spectrum exceeds a threshold.

7. The method of claims 5 or 6 further including generating an acoustic spectrum database using the detected operating acoustic spectrums.

8. A method of acoustically monitoring a wind power installation that generates electrical power, wherein the wind power installation includes a plurality of components including at least rotor blades, the method comprising:

detecting a first operating acoustic spectrum generated by at least one component during operation of the wind power installation at a first power output level;

detecting a second operating acoustic spectrum generated by the component during operation of the wind power installation at a second power output level;

comparing the first operating acoustic spectrum to a first reference acoustic spectrum;

comparing the first operating acoustic spectrum to a second reference acoustic spectrum;

detecting whether a deviation between the first operating acoustic spectrum and the first reference acoustic spectrum exceeds a first threshold;

detecting whether a deviation between the second operating acoustic spectrum and the second reference acoustic spectrum exceeds a second threshold;

communicating audible sounds which caused the deviation between the first operating acoustic spectrum and the first reference acoustic spectrum to a remote monitoring center if the deviation between the first operating acoustic spectrum and the first reference acoustic spectrum exceeds the first threshold; and communicating audible sounds which caused the deviation between the second operating acoustic spectrum and the second reference acoustic spectrum to the remote monitoring center if the deviation between the second operating acoustic spectrum and the second reference acoustic spectrum exceeds the second threshold.

9. The method of claim 8 wherein the first reference acoustic spectrum is the acoustic spectrum produced by the component during normal operation and while the wind power installation is operating at the first power output level.

10. The method of claim wherein 9 the second reference acoustic spectrum is the acoustic spectrum produced by the component during normal operation and while the wind power installation is operating at the first power output level.

11. The method of claim 8 wherein the first reference acoustic spectrum is an acoustic spectrum that is expected to be generated by the component during normal operation and while the wind power installation is operating at the first power output level.

12. The method of claim 11 wherein the second reference acoustic spectrum is an acoustic spectrum that is expected to be generated by the component during normal operation and while the wind power installation is operating at the second power output level.

13. The method of claim 8 wherein when the deviation between the first operating acoustic spectrum and the first reference acoustic spectrum exceeds the first threshold, the operation of the wind power installation is automatically or manually terminated.

14. The method of claim 8 wherein when the deviation between the second operating acoustic spectrum and the second reference acoustic spectrum exceeds the second threshold, the operation of the wind power installation is automatically or manually terminated.

15. The method of claims 8 or 14 wherein the first threshold is equal to the second threshold.

16. A method of acoustically monitoring a wind power installation that generates electrical power, wherein the wind power installation includes a plurality of components including at least rotor blades, the method comprising:

recording a first noise spectrum generated by at least one component during operation of the wind power installation at a first output power level;

comparing the first noise spectrum to a first reference noise spectrum;

detecting deviations between the first noise spectrum and the first reference noise spectrum;

communicating the deviations to a remote monitoring center; and communicating audible sounds that caused the deviations between the first noise spectrum and the first reference noise spectrum to the remote monitoring center.

17. The method of claim 16 further including continuously or repetitively recording noise spectrums generated by the at least one component during operation of the wind power installation.

18. The method of claim 16 further including generating an acoustic spectrum database using recorded noise spectrums.

19. The method of claim 16 wherein the wind power installation is shut down if the deviations between the first noise spectrum and the first reference noise spectrum exceed a predetermined threshold value.

20. The method of claim 16 further including:

recording a second noise spectrum generated by the at least one component during operation of the wind power installation at a second output power level;

comparing the second noise spectrum to a second reference noise spectrum;

detecting deviations between the second noise spectrum and the second reference noise spectrum;

communicating the deviations to a remote monitoring center; and communicating signals representative of the sounds that caused the deviations between the second noise spectrum and the second reference noise spectrum to the remote monitoring center.

21. The method of claim 20 wherein:

the first reference noise spectrum is a noise spectrum produced by the component during normal operation and while the wind power installation is operating at a first power output level; and the second reference noise spectrum is the noise spectrum produced by the component during normal operation and while the wind power installation is operating at a second power output level.

22. The method of claim 20 wherein:

the first reference noise spectrum is a noise spectrum that is expected to be generated by the component during normal operation and while the wind power installation is operating at the first power output level; and the second reference noise spectrum is a noise spectrum that is expected to be generated by the component during normal operation and while the wind power installation is operating at the second power output level.

23. The method of claim 16 wherein when the deviation between the first operating acoustic spectrum and the first reference acoustic spectrum exceeds a predetermined threshold value, the operation of the wind power installation is automatically or manually terminated.

24. The method of claim 16 wherein when the deviation between the second operating acoustic spectrum and the second reference acoustic spectrum exceeds a predetermined threshold value, the operation of the wind power installation is automatically or manually terminated.

25. The method of claim 1 further including communicating the deviation between the operating acoustic spectrum and the reference acoustic spectrum to the remote monitoring center when the deviation exceeds the threshold.

26. The method of claim 8 further including:

communicating the deviation between the first operating acoustic spectrum and the first reference acoustic spectrum to the remote monitoring center when the deviation exceeds the first threshold; and communicating the deviation between the second operating acoustic spectrum and the second reference acoustic spectrum to the remote monitoring center when the deviation exceeds the second threshold.

* * * * *